(12) United States Patent
Guy

(10) Patent No.: US 8,752,843 B2
(45) Date of Patent: Jun. 17, 2014

(54) COLLET HAVING ANGLED SEAL BORES

(75) Inventor: Hanoch Guy, Petach Tikva (IL)

(73) Assignee: Iscar, Ltd., Tefen (IL)

( * ) Notice: Subject to any disclaimer, the term of this patent is extended or adjusted under 35 U.S.C. 154(b) by 396 days.

(21) Appl. No.: 13/082,176

(22) Filed: Apr. 7, 2011

(65) Prior Publication Data

US 2011/0248456 A1    Oct. 13, 2011

(30) Foreign Application Priority Data

Apr. 11, 2010 (IL) .......................... 204981

(51) Int. Cl.
*B23B 31/20* (2006.01)
(52) U.S. Cl.
CPC ......... *B23B 31/202* (2013.01); *B23B 2260/126* (2013.01); *B23B 2250/12* (2013.01); *B23B 2226/33* (2013.01)
USPC .......... 279/43.9; 279/42; 279/46.4; 279/46.9; 279/48; 279/157
(58) Field of Classification Search
CPC .. B23B 31/20; B23B 31/202; B23B 2226/33; B23B 2231/2048; B23B 2231/2056; B23B 2231/2067; B23B 2231/24; B23B 2231/36; B23B 2231/365; B23B 2260/126; B23B 2250/12; F16D 1/09; F16D 1/092; F16D 1/095; F16D 1/096; F16D 2001/0903
USPC ......... 279/43.9, 42, 46.4, 46.9, 48, 157, 43.1, 279/43.4, 46.2, 43.8, 46.8; 403/288, 403/368–371; 277/910
See application file for complete search history.

(56) References Cited

U.S. PATENT DOCUMENTS

| 2,704,681 | A | * | 3/1955 | Fischer .......................... 403/326 |
| 3,909,021 | A | * | 9/1975 | Morawski et al. ........... 279/2.04 |
| 4,858,938 | A | * | 8/1989 | Terwilliger et al. ............. 279/57 |
| 5,028,178 | A | | 7/1991 | Ronen |
| 5,417,527 | A | * | 5/1995 | Wienhold ................. 408/239 R |
| 6,746,023 | B2 | * | 6/2004 | Komine ....................... 279/46.7 |

FOREIGN PATENT DOCUMENTS

| DE | 10850008 B | 7/1960 | |
| EP | 781616 A1 * | 7/1997 | ............. B23B 31/20 |
| EP | 1293279 A2 | 3/2003 | |
| SU | 1296305 A1 | 3/1987 | |

OTHER PUBLICATIONS

International Search Report dated Jun. 21, 2011 issued in corresponding International Application No. PCT/IL2011/000241.

* cited by examiner

*Primary Examiner* — Andrea Wellington
*Assistant Examiner* — Chwen-Wei Su
(74) *Attorney, Agent, or Firm* — Womble Carlyle

(57) ABSTRACT

A collet has seal bores formed in interspaces of the collet. The seal bores are oriented at an acute angle α to the longitudinal axis of the collet, and extend towards a tool end of the collet, from a clamping surface of the collet to a collet peripheral surface. Adjacent the clamping bore, the collet has stopping surfaces for accurately locating the seals. When inserted into the seal bores, the seals prevent fluid leakage between the clamping bore surface and the peripheral surface of the collet.

22 Claims, 2 Drawing Sheets

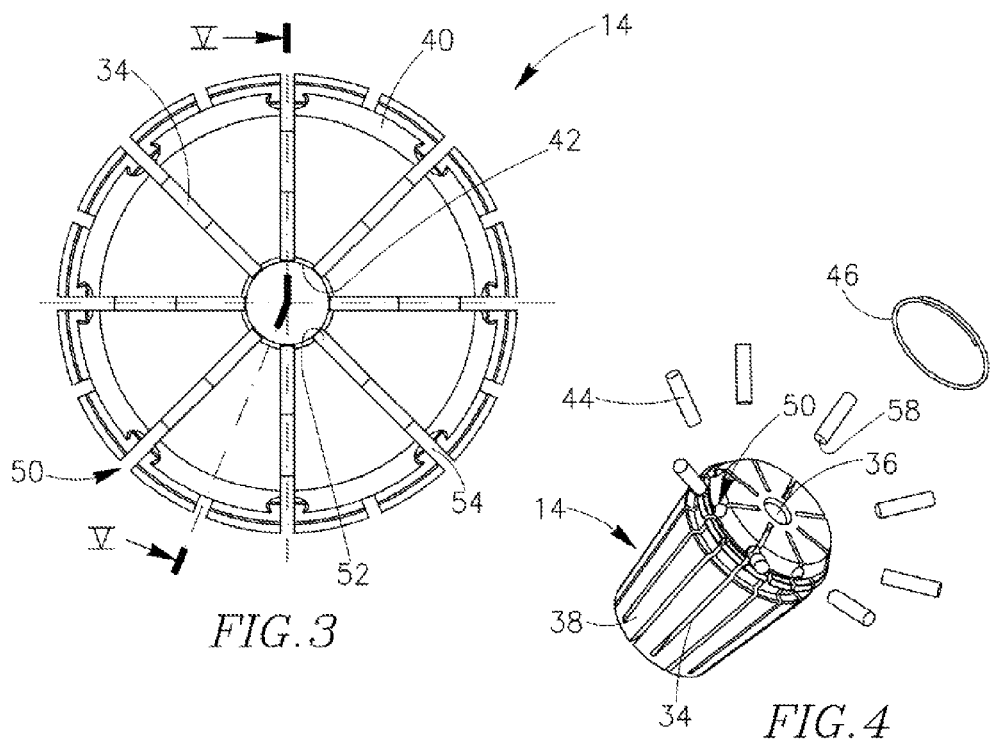
FIG. 3
FIG. 4
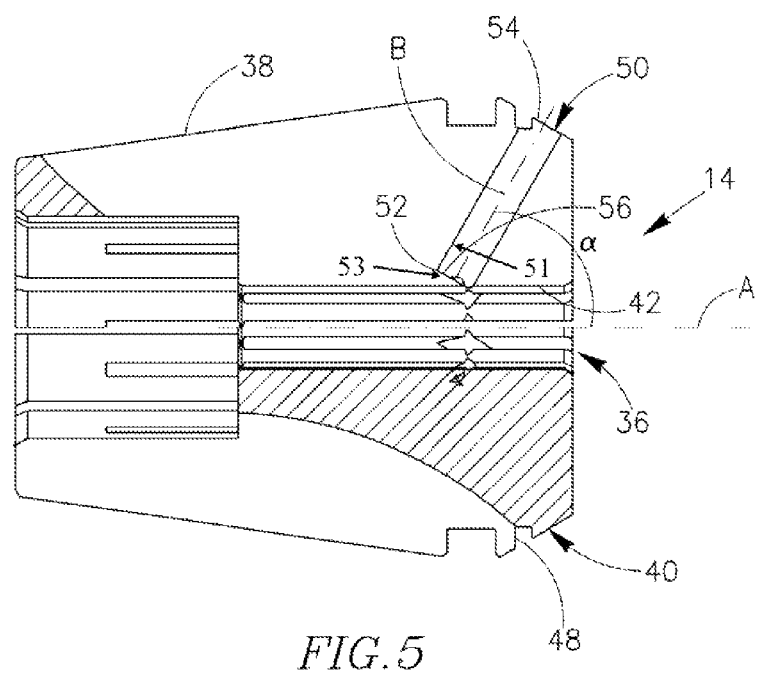
FIG. 5

US 8,752,843 B2

COLLET HAVING ANGLED SEAL BORES

FIELD OF THE INVENTION

The present invention relates to coolant sealed collets of the sort used in clamping a cutting tool.

BACKGROUND OF THE INVENTION

U.S. Pat. No. 5,028,178 discloses a spring collet with resilient stoppers which extend between a tool received in the collet and the body of the chuck. The stoppers are oriented perpendicularly to a longitudinal axis of the collet at different axial positions therealong, and prevent coolant from leaking when flowing through the collet by way of ducts in the tool.

SUMMARY OF THE INVENTION

In accordance with the present invention there is provided a collet having a longitudinal collet axis A comprising angled seal bores formed in interspaces of the collet. Each seal bore extends, between an inner end and an outer end thereof, at an acute angle towards the tool end of the collet.

The collet comprises a longitudinal clamping bore and a peripheral surface which extends between a tool end and a holder end of the clamping bore. The clamping bore comprises a clamping surface which extends from the tool end. The seal bores extend at an acute angle α to the collet axis A, from the clamping surface to the peripheral surface, towards the tool end; and the inner end of the seal bores partially intersect the clamping bore.

According to embodiments of the present invention, each seal bore has a stopping surface formed at the inner end thereof adjacent the clamping bore.

According to embodiments of the present invention, each seal bore has a seal bore axis B and each stopping surface is perpendicular to its associated seal bore axis B.

According to embodiments of the present invention, the outer end of each seal bore opens out to a forward sloping surface of the peripheral surface adjacent the tool end of the collet.

According to embodiments of the present invention, the forward sloping surface is provided with a circumferentially extending o-ring slot which at least partially overlaps the outer end of each seal bore.

According to embodiments of the present invention, the seal bores are cylindrical.

According to embodiments of the present invention, the collet has seals located in the seal bores.

According to embodiments of the present invention, the seal bores have at least the cross sectional area of the seals.

According to embodiments of the present invention, the seals are secured in position by an external o-ring seated in an o-ring slot.

According to embodiments of the present invention, the seals are cylindrical.

According to embodiments of the present invention, the seals are made of rubber.

According to embodiments of the present invention, the seals are made of silicone.

BRIEF DESCRIPTION OF THE DRAWINGS

For a better understanding of the present invention and to show how the same may be carried out in practice, reference will now be made to the accompanying drawings, in which:

FIG. 3 is an end view of the collet of FIG. 1;

FIG. 4 is an exploded view of the collet of FIG. 1; and

FIG. 5 is a cross section of the collet taken along line IV-IV of FIG. 3.

Figure 1:
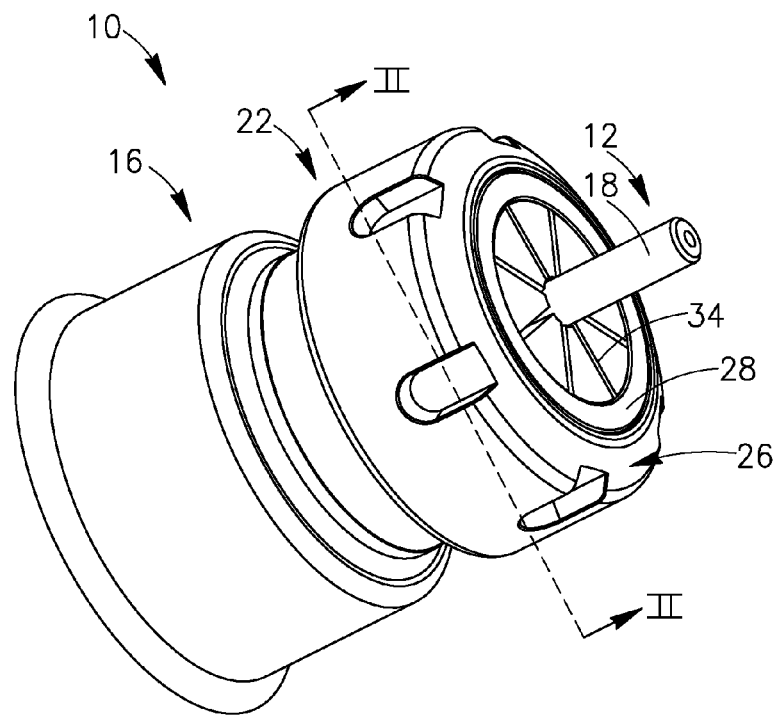
FIG. 1 is an isometric view of a cutting tool assembly, according to embodiments of the present invention.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Figure 2:
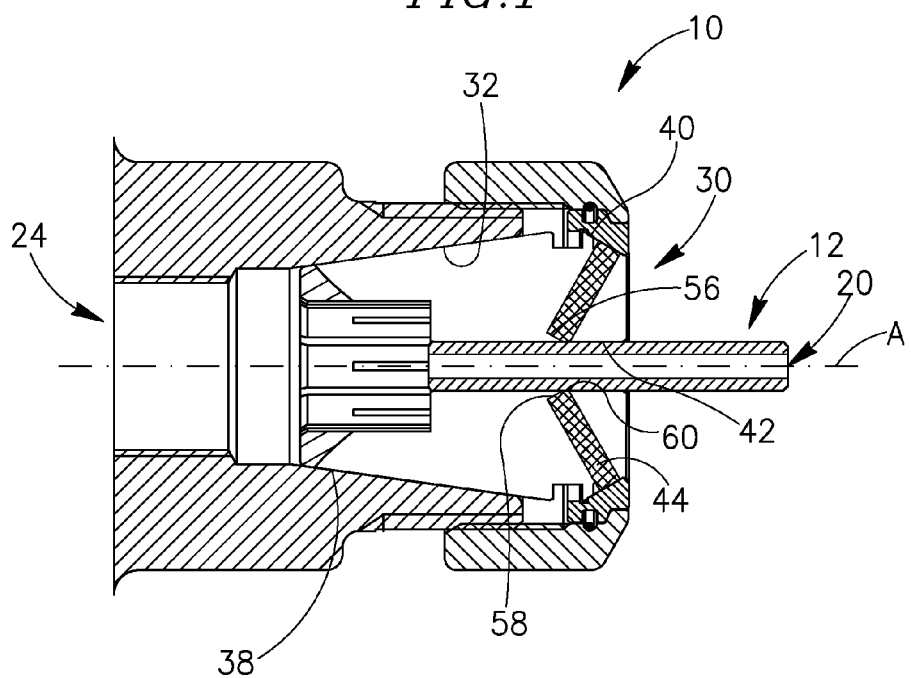
FIG. 2 is a cross section of the cutting tool assembly taken in the plane indicated by line II-II of FIG. 1.

Reference is made to FIGS. 1 and 2 showing a cutting tool assembly 10. The cutting tool assembly 10 includes a cutting tool 12, a collet 14 and a holder 16. The cutting tool 12 includes a tool shank 18 at a rear end and at least a longitudinal tool coolant channel 20 formed along the length of the cutting tool 12. The holder 16 includes a clamping portion 22, a holder coolant channel 24 and a clamping device 26 for securing the collet 14 in the clamping portion 22. According to some embodiments, the clamping device 26 has a floating clamping ring 28 for a torque-free engagement with the collet 14. The clamping portion 22 may have an external thread and a collet pocket 30 with a pocket surface 32 for receiving the collet 14.

Reference is made to FIGS. 3-5. According to some embodiments, the collet 14 has a generally frusto conical body and includes longitudinal interspaces 34, formed to enable collet flexibility. The collet 14 has a longitudinal clamping bore 36 with a clamping bore axis A and a peripheral surface 38 which extends between a tool end and a holder end of the clamping bore 36. The peripheral surface 38 includes a forward sloping surface 40 adjacent the tool end of the collet 14. The clamping bore 36 has a clamping surface 42 which extends from the tool end of the clamping bore 36. According to some embodiments, the clamping bore 36 may be non-uniform.

The collet 14 may include seals 44 to form a barrier in order to prevent coolant from passing through the interspaces 34 at the barrier, thereby sealing the collet 14. The collet 14 may include an O-ring 46 for securing the seals 44 in place. The O-ring 46 may be located in an O-ring slot 48 which extends circumferentially in the forward sloping surface 40. According to some embodiments, the seals 44 have a generally cylindrical body and are made of an elastic material such as silicone or rubber. The seals 44 may be seated in seal bores 50 formed in the interspaces 34. Each seal bore 50 has a peripheral side wall 51 and two ends, a radially inner end 52 at the clamping surface 42 and a radially outer end 54 at the peripheral surface 38. Proximate the inner end 52, a bottom wall 53 protrudes into the seal bore 50, relative to the peripheral side wall 51. According to some embodiments, the seal bores 50 open out to the forward sloping surface 40. According to some applications, the O-ring slot 48 at least partially overlaps the outer end 54 of each seal bore 50. According to some embodiments, the seal bores 50 have a cross sectional area, taken perpendicularly to a seal bore axis B, which is equal to at least the cross sectional area of the seals 44.

According to some embodiments, the seal bores 50 extend towards the tool end of the collet 14, from the clamping surface 42 to the peripheral surface 38 and the seal bore axis B forms an acute angle α with the collet axis A. In other words, the seal bores 50 slope relative to the clamping bore 36, i.e. have an angled orientation, or a non-perpendicular orientation, relative to the clamping bore 36. According to some applications, the angle α may be chosen to be between 50 and 70 degrees, and more preferably is about 60 degrees.

In order to effectively seal off the collet 14, the seal bores 50 extend from the clamping surface 42 to the peripheral surface 38. In addition, the seal bores 50 may be evenly circumferentially spaced.

In accordance with the present invention, the seal bores 50 are formed in such a way that the inner end 52 of each seal bore 50 only partially intersects with the clamping bore 36 to be in fluid communication therewith, and the outer end 54 opens out to the peripheral surface 38. The seal bores 50 may be formed, for example, by a drilling operation. This partial intersection of the seal bore 50 with the clamping bore 36 means that less than the entire cross-section of the seal bore 50 opens out into the clamping bore 36. In other words, at the inner end 52 of the seal bore 50, due to the protrusion of the bottom wall 53 into the seal bore 50, only a portion of the cross-section of the seal bore 50 opens out to the clamping bore 36. In some embodiments this portion may be less than 20% of the cross-sectional area of the seal bore 50. An advantage of this partial intersection of the clamping bore 36 by the seal bores 50, is that when the seal bores 50 are formed, a stopping surface 56 is formed on the bottom wall 53 adjacent the clamping bore 36 proximate the inner end 52 of each seal bore 50. For each seal bore 50, the stopping surface 56 holds the seal in position, preventing it from passing the stopping surface 56 in an inward direction and entering the clamping bore 36. In accordance with some embodiments, the stopping surface 56 is perpendicular to the seal bore axis B.

In accordance with some embodiments, the seal bores 50 may be cylindrical. In accordance with such embodiments, when the seal is in position in the seal bore 50, an inner end surface 58 of the seal will engage the stopping surface 56 and a small penetrating portion 60 of the inner end surface 58 of the seal 44 will be located in the portion of the inner end 52 of the seal bore 50 that is in fluid communication with the clamping bore 36. In other words the small penetrating portion 60 of the seal will be located in the clamping bore 36. In some embodiments, however, the small penetrating portion 60 may be physically removed from the clamping bore so that the clamping bore 36 will be free of any intruding parts. If desired, for example by using different drills with different cutting edge orientations, the stopping surface 56 may have orientations other than an orientation perpendicular to the seal bore axis B.

An advantage of the angled orientation of the seal bore 50 is that angled seals 44 are longer than seals 44 oriented perpendicularly in the same sealed area, and as such, fluid pressure will be spread over a larger area of the seal, making the seal less susceptible to dislodging through the interspaces 34 of the collet 14. Another advantage of the collet 14 in accordance with the present invention is that by using the o-ring 46 to prevent the seals 44 from exiting the seal bores 50 the seals 44 do not have to be tightly fitted in the seal bores 50, they can instead be loosely fitted. Such a loose fitting of the seals 44 in the seal bores 50 minimizes the influence of the seals 44 on the collet's natural flexibility.

When the cutting tool assembly 10 is assembled, the collet 14 is placed in the clamping portion 22 and the cutting tool 12 is placed in the clamping bore 36 of the collet 14. The clamping device 26 is then screwed onto the external thread of the clamping portion 22. The clamping device 26 is tightened up to a point where the peripheral surface 38 of the collet 14 engages the pocket surface 32 and the tool shank 18 is firmly clamped in the clamping portion 22 by the clamping surface 42. Pressurized coolant is pumped through the holder coolant channel 24 and through the collet clamping bore 36. If the seals 44 are not installed in the seal bores 50 of the collet 14, the coolant may flow not only through the tool coolant channel 20, but would also leak through the interspaces 34 of the collet 14. When the seals 44 are installed in the seal bores 50 of the collet 14, the stopping surfaces 56 accurately locate the seals 44 in the seal bores 50, which prevents fluid leakage between the tool shank 18 and the collet pocket 30. In other words, the collet 14 is fluid-sealed between the clamping surface 42 and the peripheral surface 38, allowing fluid to pass only through the tool coolant channel 20.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A collet (14) having a longitudinal collet axis (A) and comprising, angled seal bores (50) formed in interspaces (34) of the collet (14), each seal bore (50) comprising a peripheral side wall (51) and extending between an inner end (52) and an outer end (54) thereof;
   the collet (14) comprising a longitudinal clamping bore (36) and a peripheral surface (38) extending between a tool end and a holder end of the clamping bore (36), the clamping bore (36) comprising a clamping surface (42) extending from the tool end;
   wherein:
   the seal bores (50) extend at an acute angle α to the collet axis (A), from the clamping surface (42) to the peripheral surface (38), towards the tool end;
   proximate the inner end (52), a bottom wall (53) protrudes into the seal bore (50), relative to the peripheral side wall (51); and
   due to the protrusion of bottom wall (53) into the seal bore (50), the inner end (52) of each of the seal bores (50) only partially intersects the clamping bore (36) such that less than an entire cross-section of each of the seal bores (50) opens out into the clamping bore (36).

2. The collet (14) according to claim 1, wherein each seal bore (50) has a stopping surface (56) formed on the bottom wall (53).

3. The collet (14) according to claim 2, wherein:
   each seal bore (50) has a seal bore axis (B) extending at said acute angle α to the collet axis (A); and
   each stopping surface (56) is perpendicular to its associated seal bore axis B.

4. The collet (14) according to claim 1, wherein the outer end (54) of each seal bore (50) opens out to a forward sloping surface (40) of the peripheral surface (38) adjacent the tool end of the collet (14).

5. The collet (14) according to claim 4, wherein the forward sloping surface (40) is provided with a circumferentially extending o-ring slot (48) which at least partially overlaps the outer end (54) of each seal bore (50).

6. The collet (14) according to claim 1, wherein the seal bores (50) are cylindrical.

7. The collet (14) according to claim 1, wherein the acute angle α is between 50 and 70 degrees.

8. The collet (14) according to claim 1, wherein less than 20% of a cross-sectional area of each seal bore (50) opens out to the clamping bore (36).

9. The collet (14) according to claim 1, wherein the collet (14) has seals (44) located in the seal bores (50).

10. The collet (14) according to claim 9, wherein the seal bores (50) have at least the longitudinal cross sectional area of the seals (44).

11. The collet (14) according to claim 9, wherein the seals (44) are secured in position by an external o-ring (46) seated in an o-ring slot (48), the o-ring configured to prevent the seals (44) from exiting the seal bores (50).

12. The collet (14) according to claim 9, wherein the seals (44) are cylindrical.

13. The collet (14) according to claim 9, wherein the seals (44) are made of rubber.

14. The collet (14) according to claim 9, wherein the seals (44) are made of silicone.

15. A collet (14) having a longitudinal collet axis (A), and comprising:
   a peripheral surface (38) having a plurality of interspaces (34);
   a longitudinal clamping bore (36) extending along the collet axis (A) from a tool end to a holder end, the longitudinal clamping bore comprising a clamping surface (42) proximate the tool end;
   a plurality of angled seal bores (50) formed in the interspaces (34), each seal bore (50) comprising a peripheral side wall (51), being in fluid communication with the clamping bore and having a seal bore axis (B) which extends at an acute angle α to the collet axis (A); and
   a bottom wall (53) protruding into the seal bore (50), relative to the peripheral side wall (51); wherein:
   due to the protrusion of bottom wall (53) into the seal bore (50), only a portion of a cross-section of each seal bore (50) opens out to the clamping bore (36).

16. The collet (14) according to claim 15, wherein each seal bore (50) has a stopping surface (56) formed on the bottom wall (52).

17. The collet (14) according to claim 16, wherein:
   each stopping surface (56) is perpendicular to its associated seal bore axis (B).

18. The collet (14) according to claim 15, wherein an outer end (54) of each seal bore (50) opens out to a forward sloping surface (40) of the peripheral surface (38) adjacent the tool end of the collet (14).

19. The collet (14) according to claim 18, wherein the forward sloping surface (40) is provided with a circumferentially extending o-ring slot (48) which at least partially overlaps the outer end (54) of each seal bore (50).

20. The collet (14) according to claim 15, wherein the seal bores (50) are cylindrical.

21. The collet (14) according to claim 15, wherein the acute angle α is between 50 and 70 degrees.

22. The collet (14) according to claim 15, wherein less than 20% of the cross-section of each seal bore (50) opens out to the clamping bore (36).

\* \* \* \* \*